6964X
J. Fox,
Steam-Boiler Water-Feeder,
Patented Mar. 14, 1832.
Plate 2, Fig. 1,
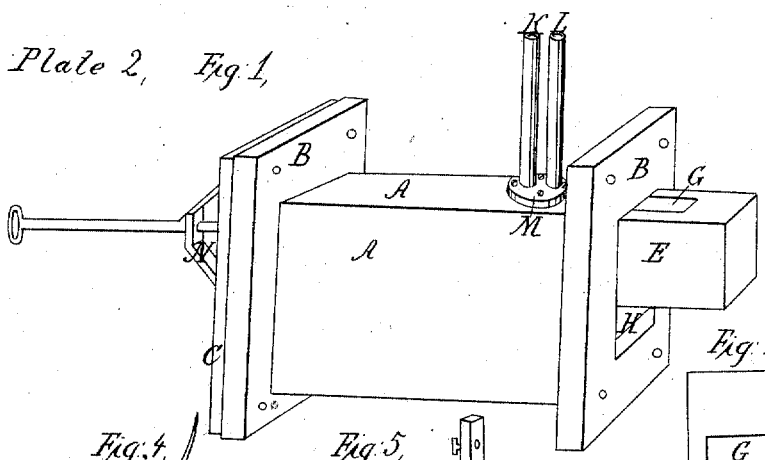
Fig. 2,
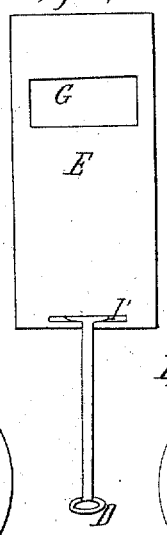
Fig. 3,
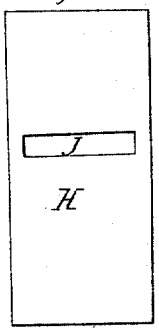
Fig. 4,
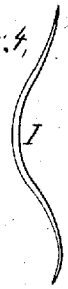
Fig. 5,
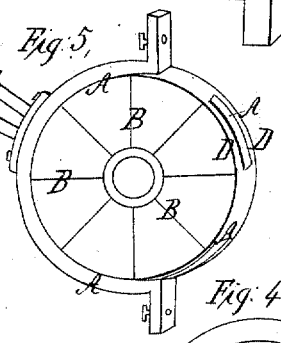
Plate 1, Fig. 1,
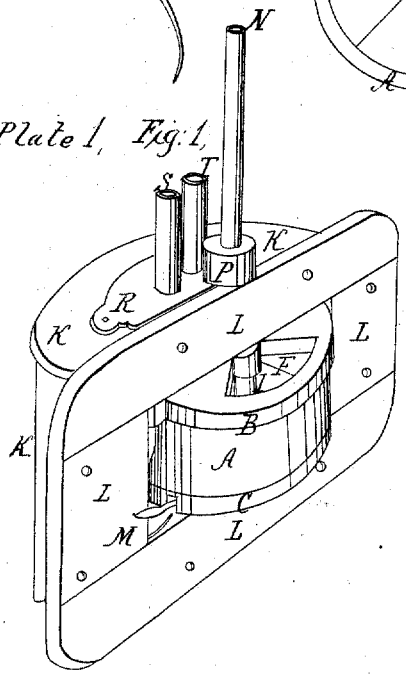
Fig. 4
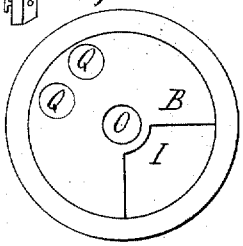
Fig. 5,
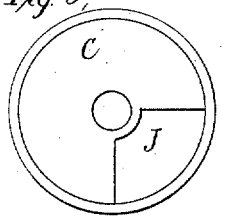
Fig. 2,
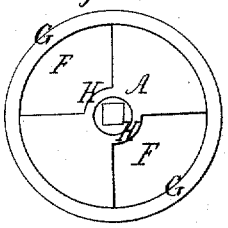
Fig. 3,
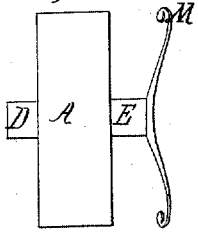
AM. PHOTO-LITHO. CO. N.Y. (OSBORNE'S PROCESS.)

6964X Mar. 14. 1832 517

Jesse Fox.

The Schedule referred to in these Letters Patent and making part of the same: containing a description in the words of the said Jesse Fox himself of his improvement in the mode of supplying Steam Boilers, or Tubes wherein Steam is Generated, with water.

To all to whom these presents shall come. Jesse Fox of Lowell in the County of Middlesex and Commonwealth of Massachusetts mechanician, sends Greeting. Be it known that I the said Jesse Fox, have invented made and applied to use a new & useful improvement in the mode of supplying Steam boilers, or boilers wherein Steam is generated, with water, which invention and improvement, and the principles thereof, and the manner of applying the same to use, are described and explained as follows, that is to say. perspective views of Machines used by me for the purpose aforesaid, and drawings of parts of such Machines are given in the plates or drawings ~~of parts of such machines are given in the plates or drawings~~ hereto annexed, numbered one two and three for the better understanding thereof, which drawings are to be taken as parts of this my specification. A in plate numbered one Figures 1,2&3. is a moveable wheel, having a fixed arbor, whose journals turn & revolve in two plates, one on each side of the wheel, the upper plate is marked B in figures 1&4. and the under plate is marked C, in figures 1&5. These plates are each one half of an inch in thickness and are circular. The wheel A is four & an half inches in diameter and one inch and one half in thickness. The plate B is five inches in diameter, and the plate C. is four inches & three eighths in diameter. The arbor of the wheel A, which passes through its centre, is three fourths of an inch in diameter & extends on each side of the wheel five eighths of an inch, forming the journals D&E. represented in figure three of plate 1. In the wheel A are two sectional apertures or openings through the wheel from one side to the other, marked F.F; these apertures are on opposite sides of the arbor as represented in figure 2, of plate 1, and occupy the greater part of two quadrants of the wheel; the periphery G.G being one fourth Drawing fourth of an inch thick, and the parts around the arbor H.H. being
one fourth of an inch thick. in the upper plate B. and the under
plate C. are apertures or openings I & J. corresponding to the aper
tures F. F. in the wheel A. It would be better that the apertures in
the upper plate B. should be a little smaller than that in the lower
plate C; and that the apertures F.F. in the wheel A should be
a little smaller at the top or upper side of the wheel and gradu=
ally increase to the bottom, or underside thereof. K.K.K. is a
semicircular case half an inch in thickness, six inches in diam
=eter and four inches in depth with a phlange L.L.L.L. of the same
thickness and one inch and one fourth in width, with holes
therein to receive bolts by means whereof & of nuts & screws the
same is secured to the boiler. In this case are the plates B.C. and
the wheel A. aforesaid placed ^is represented as in figure 1. of plate num=
bered 1. The upper plate B is secured to the case by wedges,
one on each side, driven between it and a projection on each
side of the case, & the joint between the case and the plate B,
is made steamtight by packing; The upper & under plates are
kept from turning by steady pins, connecting them with the case.
M is a flat bent spring having a hole in the centre to receive the
journal E, the ends of which spring rest upon the case and the
centre thereof bears against the plate C. & presses it together with
the wheel A up against the upper plate B. The surfaces of the
upper & under sides of the wheel A and of the under side of
the plate B. & of the upper side of the plate C. which come in contact
are first turned & then ground with emery even & smooth, so that
the joints made by the upper side of the wheel A and the under
side of the plate B, and by the under side of the wheel A & the
upper side of the plate C. may be steamtight. In the centre of
the upper end of the arbor of the wheel A, is a circular hole
five eighths of an inch in diameter drilled down even with
the upper surface or side of the wheel A and from thence
a hole three eighths of an inch square is cut or made down even even with the under side or surface of the wheel A. In a pro-
jection on the phlange L. is drilled a hole three fourths of an
inch in diameter, corresponding with the hole O in the upper
plate B and having its centre coincide with the centre of the hole O in said
plate B. Into these holes in the arbor and projection aforesaid is fitted the main [illegible]
shaft N which has a collar upon it P. resting upon the phlange so as to prevent
the shaft from going further than within one fourth of an inch of the bottom
of the square hole in the arbor of the wheel A aforesaid. That part of the shaft
N which goes into the hole aforesaid in the arbor of the wheel A and one
fourth of an inch more is made square and of dimensions corresponding
nearly with that part of the hole which is square, but a very little smaller
so that a slight inclination of the shaft may not affect the position of
the wheel A; that part of the shaft underneath the collar, which is in
the hole made through the projection in the phlange is round and made
to correspond with that hole. Q Q. are two holes made through the top
of the case and through the upper plate B one fourth of an inch apart,
and opposite to the aperture I in said plate B. occupying a less space
than the said aperture, so that, when either of the apertures F F. in
in the wheel A are by its revolution brought immediately under
the said holes, & they are, as nearly as may be, in the centre thereof, the outer
edge of each of the said holes may then be three eighths of an inch from
the edge of the aperture, in order to prevent the steam from passing from
the boiler and rushing up these holes. On the top of the case is a cap
R secured thereto by screws, in which case are two holes a little larger
than those last described so as to admit the pipes S T. the calibres
of which are of the same diameter with & correspond to the holes
Q Q in plate B. which pipes are tightly fitted into the said cap. The
pipes S & T each communicate with separate fountains of water a few
feet above the boiler, the level of the fountain with which the pipe S com-
municates being a little below the level of the fountain with which the pipe
T communicates; so as to create a greater pressure of water in the pipe T in
order that in case the steam uncondensed should enter & drive up the water
in the pipe S & hold it in suspense, the water in the pipe T where the pressure is is greater may descend and fill the cavities F.F. in the wheel A as by its
revolution they are made to pass underneath successively. A hole of suf-
ficient length and breadth must be cut in the head of the boiler to admit
those parts of the plates B. C. & of the wheel A. which project beyond the
phlange L.L.L.L. and so that when the case is fixed upon the boiler and
secured thereto with packing, the middle of the rim of the wheel A. which
is to be so placed as to move horizontally, shall be on the same level at
which it is desired to keep the water in the boiler, and that there should
be a space of about one fourth of an inch above the upper plate B, &
between it & the edge of the hole made in the boiler and a space of about
one half an inch underneath the under plate C. and between it and
the edge of the hole made in the boiler to admit the steam into the
spaces & apertures in the plates & wheel from the boiler & to allow the
water to escape from the spaces & apertures aforesaid into the boiler.
The plate C. is made a little smaller than the wheel A so that the pressure
of the steam upon it may not be so great as the pressure upon the
wheel A in order, that in case the water in the cavities F.F. in
passing from the pipes into the boiler should expand it may pass
down the plate C and escape between it and the wheel A into
the boiler, instead of passing down the wheel A and allowing
the steam to escape from the boiler up the pipes. The wheel A is
to be made to revolve in such direction that the apertures F.F. in
first come under pipe S & then under the pipe T. The case wheel &
plates, may be made of cast iron, or other suitable material.
The shaft may be made of wrought iron excepting the lower end,
which goes into the arbor of the wheel, which as well as said arbor
ought to be made of steel. The pipes may be made of copper or
other like suitable material. The power to move the shaft N and
cause the wheel A to revolve is applied to the said shaft by means
of a pulley or a pinion wheel upon the said shaft. As the wheel
A revolves the apertures F.F. therein are brought successively one
or some to correspond with the apertures I & J. in the plates B & C,
and under the holes below the pipes S & T, When either of the apertures
FF 6964x Mar. 14, 1832

E.E. is beneath the pipes, it is filled with water, which by the revolution of the wheels is carried into the boiler and thereby its specific gravity falls to a level with the water therein, & its place is supplied by steam from the boiler, which being carried underneath the pipes is condensed by the water therein, & its place is supplied by water which is carried & falls into the boiler as before. and in case the water in the boiler should be on a level with the surface of the upper side of the wheel A it is obvious that the same quantity of water at each revolution of the wheel would be carried from the boiler as might be carried into it, and the water could rise no higher; and as the water rises above the surface of the lower side of the wheel a proportionally lefs quantity is left in the boiler in each revolution. A machine of the dimensions above described, when the wheel makes thirty revolutions a minute, will convey into the boiler about two hundred & forty cubic inches of water a minute, but in order to provide against occasional extra expenditures of water, it ought not to be applied at that speed, to a boiler when the expenditure of water ordinarily exceeds two hundred cubic inches a minute; and in case the expenditure of water is ordinarily greater than is above mentioned the dimensions of the machine must be proportionably increased, or the velocity of the wheel must be proportionably accellerated; but the velocity of the wheel must not be so great as not to give sufficient time for the water to fall from the cavities in the wheel into the boiler. The object of the above described machine or apparatus is to keep the water in the boiler at nearly an equal and uniform height required under the various degrees of heat & temperature & expenditure of water to which under various circumstances steam boilers may be subjected. Instead of the above apparatus, a solid wheel Plate [illegible] Fig 6, similar in dimensions to the wheel above described, fitted into a case of similar form to that above described, & having cavities A.A.A.A. cut down from the periphery periphery thereof, so that the sides may coincide with the radii B.B. to
to the part c around the arbor, and so as to leave on each side D.D. one
fourth of an inch, and one fourth of an inch c. around the arbor,
may be made to revolve vertically, instead of horizontally, in the
case, which is to be attached to the boiler. In this case the periphery
of the wheel & that part of the case in contact with it must be
ground even & smooth so as to make a steam tight joint, &
the pipes E.E. by which the water is admitted into the cavities
A.A.A.A. and by the revolution of the wheel carried into the
boiler in like manner as before described must be let into the
circular part of the case. The wheel in this case is to be moved by a
shaft passing through a slot in one side of the case, through the wheel
to which it is fixed, and into a horizontal slot on the inside of the opposite
side of the case. The object of these horizontal slots is to allow the wheel
as it wears to come up always close to the case; and the wheel is made
to bear close up against the case by a spring bearing against the shaft
on each side of the wheel within the case. In order to prevent the
steam from escaping from the horizontal slot through the case
a packing box is attached to the shaft on the inside of the case, so
ground so as to make the joint between it and the case steam tight
The motion of the wheel should be in such direction as that the cavities
may come under the hole beneath the pipe E first. These pipes & the
holes beneath them, & the fountains of water connected with them are
to be made in a similar manner to those herein before described.
And this Machine in carrying in water to the boiler, & bringing out steam
to be condensed operates like the machine first above described. The
size and velocity of the wheel must like that in the apparatus first above
described be adapted to the quantity of water required to be carried into
the boiler in a given time. But the apparatus and mode of supplying boilers
first above described, I consider far preferable to this. an apparatus however
somewhat different from either of those above described, represented
in plate 3. Figure 1. may be used for the same purpose; and is described
as follows A.A. in plate 3. Figure 1, is a rectangular case four inches

[illegible]

6964x Mar 14, 1832 square on the outside, half an inch thick & seven inches long including the phlange BB. These phlanges are half an inch thick & project an inch and one fourth beyond the case; by one of which the case is confined to the boiler; and by the other of which the plate C, one half inch thick, covering that end of the case, is fastened. Through this plate passes the rod D one fourth of an inch in diameter around which is a packing box. This rod is connected with the slide E having prongs which act in the slot F, so as that the slide may be moved backward & forward with the rod. This slide moves backward and forward three inches and is thereby moved into the boiler two inches & three fourths & thence back alternately; it is six inches & three fourths in length, three inches in breadth, and two inches & one fourth in thickness. One inch & three fourths from the end of the slide next to the boiler, is a rectangular hole or aperture G through the slide one inch in width lengthwise of the slide & two & an half inches widthwise of the slide.) The slide in moving out of the boiler is brought back until the opposite end comes to the inner side of the plate C & the end next to the boiler is drawn ~~in drawn~~ into the case one fourth of an inch. H is one half an inch thick and of the same width & length with the slide E. & fitted into the case under said slide and kept tight against it by a spring I. which also keeps the slide tight against the upper surface of the rectangular cavity in the case in which it moves. Two inches & an half of the upper surface of the plate H from the end next to the plate C. is cut down one fourth of an inch so that this part of the surface may not touch the slide, J is a rectangular hole or aperture through the plate H Fig 8 Pl 2. three inches from the end next to the boiler, half an inch wide lengthwise of that plate and two inches & an half long widthwise of the same plate; through which the steam may pass through a space in under the plate so as to act against the slide & press it up with more force than the plate is pressed up with thereby to allow the water in the aperture G in case of expansion in passing into the boiler to escape escape between the plate & the slide by pressing down the plate
instead of pressing down the slide and allowing the steam to
escape from the boiler between it, & the upper surface of the inside
of the case, through the pipes. The upper and under surfaces of the
slide, the upper surface of the plate, & the surface of the cavity in the
case against which the upper surface of the slide acts are all
ground as even and smooth as possible so as to make steam tight
joints. I is a flat bent spring four and a half inches long, & three
inches wide the ends of which bear against the under surface
of the plate & the center of which bears against the lower surface
of the cavity in the case. It is placed at that end of the plate
next to the boiler, and is prevented from working out of the
case by the boiler against, which one end comes in contact, &
at the other end is a pin in the plate to prevent it from working
farther into the box. K L, are two pipes communicating with
holes in the case A for the purpose of conveying water into
the cavity C. in the slide & thence into the boiler, in the same way
as is described above in the other apparatus with which the
wheel is connected. These pipes are one half an inch in diam
eter and are secured steam tight in a cap M screwed to the
case. Underneath the pipes K L are holes through the case one
eighth of an inch apart & seven sixteenths of an inch in diameter,
to allow the water to pass into the cavity in the slide when it is
drawn into the box or case. The pipe L is two inches from the end
of the case next to the boiler, which is connected with a fountain
the level of which is a little lower than that with which the pipe
K is connected, to create a greater pressure of water in the pipe
K, so that in case the steam uncondensed should enter & drive
up & hold in suspense the water in the pipe L, the water in the
pipe K, where the pressure is greater, may descend into the cavity
C in the slide. E N is a guide for the rod to move in secured to the
plate. The apparatus last above described will supply a boiler
with water, ordinarily requiring one hundred & twenty five
cubic 6964x Mar 14, 1832

Cubic inches a minute, when the slide performs thirty strokes a minute. When a greater expenditure of water is required, the dimensions of the apparatus must be proportionally increased, or the velocity of the slide must be accelerated; but the ve=locity of the slide must not be accelerated so as not to allow the water time to fall from the cavity into the boiler. When there is considerable pressure it may be well to make the cases above described somewhat thicker & stouter. And the under surface of the upper side of the case A. Plate 3. Fig. 1. for two inches & an half from the end opposite the boiler ought to be cut or filed away a little so that the upper surface of the slide may not touch it. The apparatus last mentioned operates as well as that first above described in supplying a steam boiler with water, but it occupies more space, and is deemed not to be so durable, & on the whole the apparatus first above described is con=sidered as the best. And the apparatus secondly above descri-bed is the least preferable where there is a considerable pressure of steam, as the water in that case will not be so readily dis=charged from the cavities, and as, in case of the expansion of the water in the cavities, in passing into the boiler, the wheel may be thrown off from or separated from the case so as to allow the steam to escape through the pipes, & under no circumstances
by any means as the apparatus firstly or lastly [illegible] described.
is it considered so good. The manner of applying the apparatus last described to the boiler will be readily understood by re=ference to the manner of applying the apparatus first descri=bed herein set forth. It is to be made of like materials with the others above described. What is claimed as a new & useful im=provement & invention, is the supplying of steam boilers with water by such apparatus or machinery as is above mentioned and so much & such parts of the machinery & apparatus afore=said in combination as is necessary & proper for effecting the purposes aforesaid. In testimony that the above is a true specification of my said invention and improvement above above described. I have hereunto set my hand and seal this tenth day of February in the year of our Lord eighteen hundred and thirty two.

(Signed sealed & delivered in presence of us) Jedd Fox

Eyde. Wm Rowed
Hyde. Augustus H. Fisher (4158 Wm H)